United States Patent
Piscopo, Jr. et al.

(10) Patent No.: US 10,587,991 B2
(45) Date of Patent: Mar. 10, 2020

(54) ROUTING MULTIPLE NUMBERS FOR ONE TELECOMMUNICATIONS DEVICE

(71) Applicant: T-Mobile USA, Inc., Bellevue, WA (US)

(72) Inventors: Robert F. Piscopo, Jr., Bellevue, WA (US); Shelby Seward, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/521,167

(22) Filed: Jul. 24, 2019

(65) Prior Publication Data

US 2019/0349723 A1    Nov. 14, 2019

Related U.S. Application Data

(63) Continuation of application No. 15/794,617, filed on Oct. 26, 2017, now Pat. No. 10,368,209, which is a
(Continued)

(51) Int. Cl.
*H04W 4/16* (2009.01)
*H04L 29/06* (2006.01)
*H04L 29/08* (2006.01)

(52) U.S. Cl.
CPC ........... *H04W 4/16* (2013.01); *H04L 65/1006* (2013.01); *H04L 65/1016* (2013.01);
(Continued)

(58) Field of Classification Search
CPC ............ H04L 2209/42; H04L 63/0407; H04L 63/0421; H04W 12/02; H04W 64/00; G06F 21/60
See application file for complete search history.

(56) References Cited

U.S. PATENT DOCUMENTS 5,329,578 A    7/1994 Brennan et al.
5,802,160 A    9/1998 Kugell et al.
(Continued)

FOREIGN PATENT DOCUMENTS

CN    1123507 A1    5/1996
CN    2002108775 A    4/2002
(Continued)

OTHER PUBLICATIONS

"Can I get Multiple Google Voice Numbers To one Phone?" retrieved Mar. 20, 2015 at «http://www.quora.com/Can-I-get-multiple-Google-Voice-numbers-to-one-phone?share=1» 4 pages.
(Continued)

*Primary Examiner* — Kwasi Karikari
(74) *Attorney, Agent, or Firm* — Lee & Hayes, P.C.

(57) ABSTRACT

In some implementations, a core network device can receive an initiation request of a communication session to an alias number. The core network device can retrieve from a registration database one or more destination number(s) corresponding to the alias number. The core network device can transmit respective indication(s) of the alias number to destination(s) corresponding to the retrieved destination number(s). The core network device can initiate the communication session to one of the destination(s) using the respective one of the retrieved destination number(s). A destination number can correspond to a computing device, e.g., user equipment, configured to answer calls originating from an alias number that is different from the destination number, by receiving an intent message indicating the alias number, transmitting an acknowledgement, subsequently receiving an invitation message directed to the destination number for a communication session with another device, and transmitting an acceptance message to the other device.

20 Claims, 5 Drawing Sheets

Related U.S. Application Data continuation of application No. 14/710,861, filed on May 13, 2015, now Pat. No. 9,820,116.

(52) U.S. Cl.
CPC ........ *H04L 65/1069* (2013.01); *H04L 67/141* (2013.01); *H04L 67/2838* (2013.01)

(56) References Cited

U.S. PATENT DOCUMENTS

| | | | |
|---|---|---|---|
| 8,315,613 B1 | 11/2012 | Rahman et al. | |
| 9,060,057 B1 | 6/2015 | Danis | |
| 9,729,702 B2 | 8/2017 | Seward et al. | |
| 2003/0125072 A1 | 7/2003 | Dent | |
| 2004/0120552 A1 | 6/2004 | Borngraber et al. | |
| 2005/0075106 A1 | 4/2005 | Jiang | |
| 2005/0201362 A1 | 9/2005 | Klein et al. | |
| 2006/0089140 A1 | 4/2006 | Zhang | |
| 2006/0094451 A1 | 5/2006 | Lee | |
| 2006/0105766 A1 | 5/2006 | Azada et al. | |
| 2006/0140200 A1 | 6/2006 | Black et al. | |
| 2006/0234690 A1 | 10/2006 | Itzkovitz et al. | |
| 2006/0280169 A1 | 12/2006 | Mahdi | |
| 2007/0064900 A1* | 3/2007 | Kowalewski | H04Q 3/0045 379/202.01 |
| 2007/0167158 A1 | 7/2007 | Ajjannavar et al. | |
| 2007/0189264 A1 | 8/2007 | Liu | |
| 2007/0206573 A1 | 9/2007 | Silver | |
| 2007/0253545 A1 | 11/2007 | Chatterjee et al. | |
| 2008/0025488 A1* | 1/2008 | Dean | H04M 3/42008 379/201.11 |
| 2008/0043957 A1 | 2/2008 | Guo | |
| 2008/0089501 A1 | 4/2008 | Benco et al. | |
| 2008/0175174 A1 | 7/2008 | Altberg et al. | |
| 2009/0061872 A1 | 3/2009 | Hicks | |
| 2010/0098057 A1 | 4/2010 | Stewart | |
| 2010/0128857 A1 | 5/2010 | Logan | |
| 2010/0291913 A1 | 11/2010 | Xu | |
| 2011/0045806 A1 | 2/2011 | Gupta et al. | |
| 2011/0061008 A1 | 3/2011 | Gupta et al. | |
| 2011/0163848 A1 | 7/2011 | Shibata | |
| 2011/0294472 A1 | 12/2011 | Bramwell et al. | |
| 2012/0033610 A1 | 2/2012 | Ring et al. | |
| 2012/0099719 A1 | 4/2012 | Erb | |
| 2012/0129508 A1 | 5/2012 | Gentry | |
| 2012/0290638 A1 | 11/2012 | Narula et al. | |
| 2013/0065567 A1 | 3/2013 | Cui et al. | |
| 2013/0157614 A1 | 6/2013 | Al-Zaben | |
| 2013/0288657 A1 | 10/2013 | Huang | |
| 2013/0331096 A1 | 12/2013 | Rogan | |
| 2014/0052793 A1 | 2/2014 | John et al. | |
| 2014/0079201 A1 | 3/2014 | Bennett | |
| 2014/0274008 A1 | 9/2014 | Olodort | |
| 2015/0163731 A1 | 6/2015 | Kotecha | |
| 2015/0189080 A1 | 7/2015 | Lin | |
| 2015/0215459 A1 | 7/2015 | Kirchhoff et al. | |
| 2015/0244862 A1 | 8/2015 | Salazar et al. | |
| 2016/0337513 A1 | 11/2016 | Seward et al. | |
| 2016/0337825 A1 | 11/2016 | Piscopo, Jr. et al. | |
| 2017/0041460 A1 | 2/2017 | Seward et al. | |
| 2017/0078484 A1 | 3/2017 | Seward et al. | |
| 2017/0324862 A1 | 11/2017 | Seward et al. | |
| 2018/0115878 A1 | 4/2018 | Piscopo, Jr. et al. | |
| 2018/0249007 A1 | 8/2018 | Seward et al. | |

FOREIGN PATENT DOCUMENTS

| | | |
|---|---|---|
| CN | 1503542 A | 6/2004 |
| EP | 2099242 A2 | 9/2009 |
| KR | 1020050018723 A | 2/2005 |
| KR | 1020060056051 A | 5/2006 |
| KR | 1020070060616 A | 6/2007 |
| KR | 1020070074291 A | 7/2007 |
| KR | 1020100113664 A | 10/2010 |
| KR | 1020120058203 A | 6/2012 |
| KR | 1020130140332 A | 12/2013 |
| WO | WO02089510 A1 | 11/2002 |
| WO | WO2006085303 A2 | 8/2006 |
| WO | WO2013085852 A1 | 6/2013 |

OTHER PUBLICATIONS

The Extended European Search Report dated Oct. 10, 2018 for the European Application No. 16793146.8, 8 pages.
The Extended European Search Report dated Oct. 11, 2018, for European Application No. 16793418.1, 11 pages.
The Extended European Search Report dated Feb. 18, 2019 for European Patent Application No. 16833503.2, 16 pages.
The Partial Supplemetary European Search Report dated Feb. 8, 2019 for European Patent Application No. 16847076.3, 15 pages.
The Extended European Search Report dated May 14, 2019 for European Patent Application No. 16847076.3, 12 pages.
Garcia-Martin et al, "Private Header (P-Header) Extensions to the Session Initiation Protocol (SIP) for the 3rd Generation Partnership Project (3GPP)," Jan. 2003, Network Working Group, RFC 3455, 34 pages.
Office action for U.S. Appl. No. 14/854,492, dated Oct. 21, 2016, Seward et al., "Communication Termination Using Hunt Groups and Implicit Registration,", 12 pages.
Office Action for U.S. Appl. No. 15/794,617, dated Feb. 26, 2019, Piscopo et al, "Routing Multiple Numbers For One Telecommunications Device," 8 pages.
Office Action for U.S. Appl. No. 14/710,812, dated Mar. 1, 2018, Seward, "Client Application Enabling Multiple Line Call Termination and Origination," 17 pages.
Office action for U.S. Appl. No. 14/710,861 dated Mar. 24, 2016, Piscopo Jr. et al., "Routing Multiple Numbers for One Telecommunications Device," 10 pages.
Office action for U.S. Appl. No. 14/854,492 dated Mar. 30, 2017, Seward et al., "Communication Termination Using Hunt Groups and Implicit Registration," 15 pages.
Office action for U.S. Appl. No. 14/710,861 dated Mar. 8, 2017, Piscopo Jr. et al., "Routing Multiple Numbers for One Telecommunications Device," 7 pages.
Office action for U.S. Appl. No. 14/710,812, dated Apr. 5, 2016, Seward et al., "Client Application Enabling Multiple Line Call Termination and Origination," 15 pages.
Office action for U.S. Appl. No. 14/816,461, dated May 18, 2017, Seward, "Originating a Voice Call from a Selected Number Using a Temporary Routing Number," 7 pages.
Office action for U.S. Appl. No. 14/854,492, dated Jul. 21, 2017, Seward et al., "Communication Termination Using Hunt Groups and Implicit Registration," 13 pages.
Office action for U.S. Appl. No. 15/965,693, dated Jul. 26, 2018, Seward, "Communication Termination Using Hunt Groups and Implicit Registration," 7 pages.
Office Action for U.S. Appl. No. 14/710,812, dated Sep. 12, 2017, Seward, "Client Application Enabling Multiple Line Call Termination and Origination," 11 pages.
Office action for U.S. Appl. No. 14/710,861 dated Sep. 23, 2016, Piscopo Jr. et al., "Routing Multiple Numbers for One Telecommunications Device," 9 pages.
Office action for U.S. Appl. No. 14/710,861 dated Sep. 28, 2016, Piscopo Jr. et al., Routing Multiple Numbers for One Telecommunications Device,, 6 pages.
Office action for U.S. Appl. No. 14/710,812, dated Sep. 28, 2016, Seward et al., "Client Application Enabling Multiple Line Call Termination and Origination," 17 pages.
Office Action for U.S. Appl. No. 15/794,617, dated Sep. 28, 2018, Piscopo et al, "Routing Multiple Numbers For One Telecommunications Device," 10 pages.
PCT Search Report and Written Opinion dated Oct. 20, 2016 for PCT Application No. PCT/US16/42847, 10 pages.
PCT Search Report and Written Opinion dated Dec. 20, 2016 for PCT Application No. PCT/US16/50540, 13 pages.

(56) References Cited

OTHER PUBLICATIONS

The PCT Search Report and Written Opinion ated Jul. 27, 2016 for PCT application No. PCT/US2016/031793, 11 pages.
The PCT Search Report and Written Opinion dated Aug. 3, 2016 for PCT application No. PCT/US2016/029188, 14 pages.
Pinola, "How to Spoof Caller ID," retrieved on Feb. 1, 19 at «https://lifehacker.com/how-to-spoof-caller-id-5853056» Oct. 25, 2011.
Siemens, "Forking Support in MGCF and AS." 3rd Generation Partnership Project, Mobile Competence Centre, vol. TSG SA, No. Maui, Nov. 27, 2003, 3 pages.
Summerson, "Goggle Voice Now Lets You Have Multiple Numbers on One Account-for-a-Fee," Jun. 2011, retrieved Mar. 20, 2015 at «www.androidpolice.com/2011/06/10/google-voice-now-lets-you-have-multiple-numbers-on-one-account-for-a-fee/» 4 pages.
The European Office Action dated Oct. 23, 2019 for European Patent Application No. 16793418.1, a counterpart of U.S. Pat. No. 9,820,116, 8 pages.
Rosenberg et al, "SIP: Session Initiation Protocol," Jun. 1, 2002, pp. 1-269.
Chinese Office Action dated Jan. 3, 2020 for Chinese Patent Application No. 201680044999.7, a foreign application of the U.S. Appl. No. 14/710,861, 10 pages.

\* cited by examiner

ROUTING MULTIPLE NUMBERS FOR ONE TELECOMMUNICATIONS DEVICE

RELATED APPLICATION

This application is a continuation of and claims priority to U.S. patent application Ser. No. 15/794,617, filed on Oct. 26, 2017, which is a continuation of and claims priority to U.S. patent application Ser. No. 14/710,861, filed on May 13, 2015, the disclosures of which are incorporated by reference herein.

BACKGROUND

A computing device, such as a wireless phone, that is capable of terminating (e.g., receiving) or originating phone calls is typically associated with one particular phone number. The computing device can only terminate phone calls whose called number is the particular phone number. Thus, someone with, e.g., multiple businesses can have to carry multiple computing devices, because each of the computing devices is associated with a different phone number. Not only is this cumbersome for the user, but wasteful because the user has to acquire multiple computing devices, one computing device per phone number.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Systems and techniques described herein permit computing devices to terminate (e.g., receive) multiple calls for multiple lines, even on networks that require a computing device to be uniquely associated with a particular phone number (e.g., a mobile station international subscriber directory number, MSISDN). The term "call" as used herein can include a voice call, e.g., where the user desires to speak to another human being. Moreover, systems and techniques herein permit devices to terminate calls for multiple lines in a manner that is convenient for the user, e.g., without requiring the user to manually select a particular phone number for which calls should be terminated.

When a user acquires (e.g., purchases, leases, etc.) a computing device, such as a wireless phone, from a network provider (e.g., a carrier, such as T-Mobile®), the network provider can provide a telephony client software application ("client application") that can be installed on multiple computing devices associated with the user, e.g., the user's wireless phone. The client application can be or include a "native dialer," e.g., the application installed by the manufacturer of the wireless phone to control origination and termination of calls. The client application can additionally or alternatively be or include an app, e.g., a downloadable client app, or other executable code separate from the native dialer. In some examples, the client application includes an app or other executable code that invokes or interacts with the native dialer to terminate calls, as described below.

The user's wireless phone can be associated with a particular phone number, e.g., a MSISDN, referred to herein as a "device number." The user's wireless account can be associated with one or more additional phone numbers, referred to herein as "alias numbers." For example, the alias numbers can include a first number through an Nth alias number (N>0). The client application or another application or interface provided by the network provided can permit the user to select, enter, or view the additional phone numbers, or to add descriptions for the additional phone numbers, e.g., "personal," "work," or "school." The client application can permit the user to terminate calls that have one or more additional phone numbers as the called number. In some examples, the client application can operate in a cellular mode in which calls are received via a cellular radio.

In some examples, when a second user calls one of the alias numbers, the client application can display an indication of an incoming call to the called alias number and ask if the user of the computing device desires to answer (e.g., terminate) the incoming call. The client application can thus permit the user to, in addition to answering the user's personal calls using the computing device, answer calls to, e.g., a business associated with the user using the computing device. The client application can permit the user to answer calls to members of the user's family. For example, the user can answer, using the computing device on which the client application is installed (e.g., a wireless phone), a call having a called number associated with the user's spouse or the user's child. Thus, the user can answer an incoming call using the computing device where the called number associated with the incoming call is different from a destination number at which the user's wireless phone is reachable, e.g., the device number associated with the user's wireless phone.

In some examples, a core network device is communicatively connectable with user equipment or another computing device. For example, the core network device can include a telephony application server (TAS). The core network device can be configured to receive from a user equipment an initiation request of a communication session to an alias number, e.g., an outgoing call to the alias number. The core network device can retrieve from a registration database one or more destination number(s) corresponding to the alias number. The core network device can transmit respective indication(s) of the alias number to destination(s) corresponding to the retrieved destination number(s), e.g., transmit one or more intent message(s) to ones of the destination(s). The core network device can then initiate the communication session to one of the destination(s) using the respective one of the retrieved destination number(s), e.g., by signaling an incoming call to that one of the destination(s).

Figure 1:
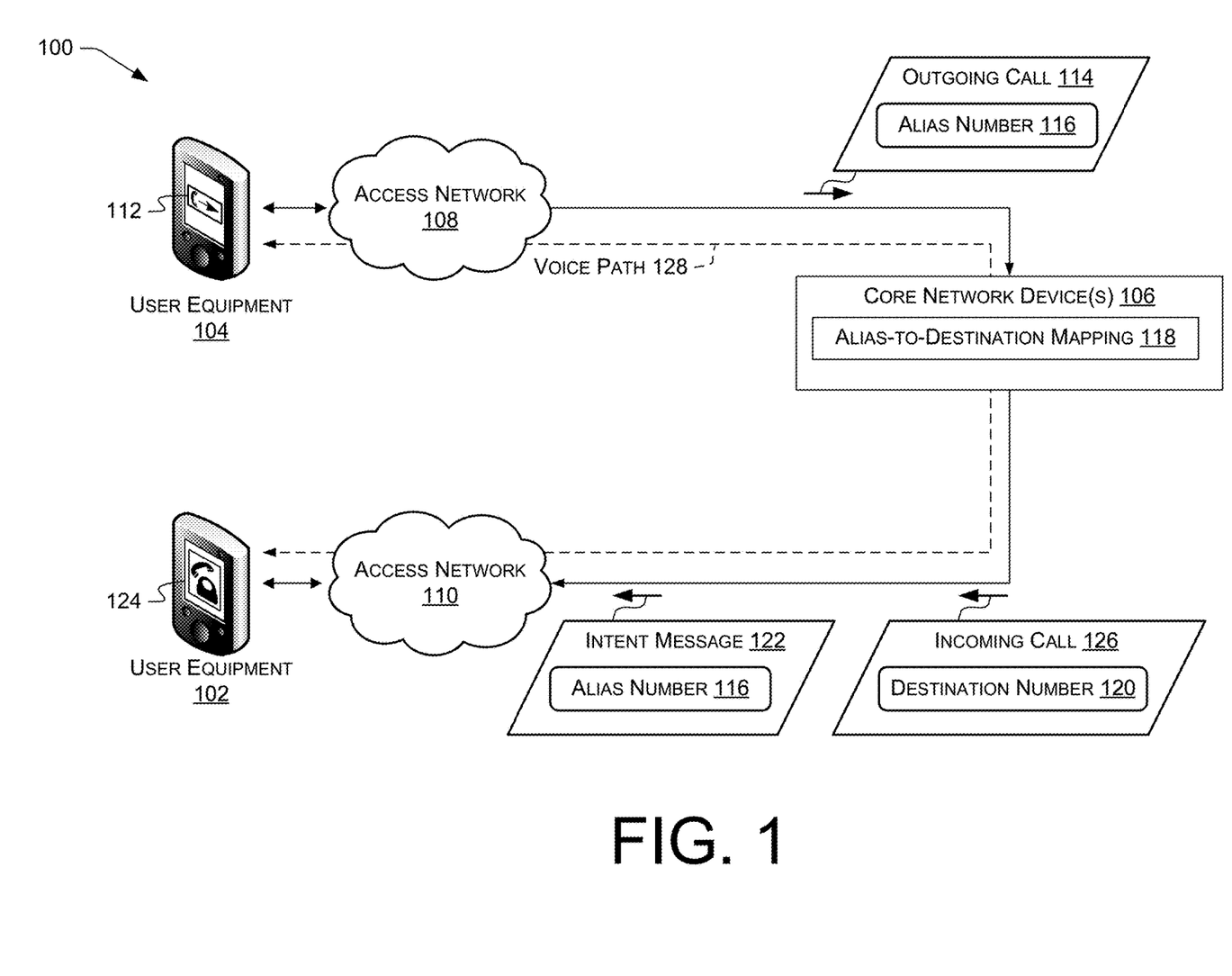
FIG. 1 is a block diagram illustrating a system that includes a client application enabling multiple line call termination according to some implementations.

FIG. 1 is a block diagram illustrating a telecommunication system 100 according to some examples. The system includes computing devices 102 and 104, e.g., user equipment (UE) or other mobile phones or communications devices. The computing devices 102 and 104 can be operated, e.g., by a user and a second user respectively (not shown). The computing devices 102 and 104 are communicatively connected to one or more core network device(s) 106, e.g., via respective access networks 108 and 110.

When the second user desires to place a call to the first user, the computing device 104, e.g., in response to actuation by the second user of a "Send" control 112, transmits an initiation request of a communication session. The initiation request, shown as outgoing call 114, indicates an alias number 116 of the computing device 102. The core network device(s) 106 receive from the computing device 104 the initiation request (outgoing call 114) and perform an alias-to-destination mapping 118 to determine at least one destination number 120 corresponding to the alias number 116. For example, an alias number 116 of 867-5309 could be mapped to the destination number 120 of 555-1212. In some examples, the destination number 120 is a device number, e.g., an MSISDN, of the computing device 102.

The core network device(s) 106 then transmits respective indication(s) of the alias number 116 to destination(s) corresponding to at least one of the retrieved destination number(s) 120, e.g., to destination(s) corresponding to the retrieved destination number(s). This transmission of an indication is referred to herein as an "intent message," and is depicted as intent message 122 including the alias number 116. In this example, only one destination is shown, namely the computing device 102. However, the core network device(s) 106 can transmit any number of intent messages 122 to any number of destinations. The user of the computing device 102 can then indicate the call should be accepted, e.g., by operating a call-acceptance control 124 such as a touchscreen button. In response to operation of the call-acceptance control 124, the computing device 102 can transmit an acknowledgement to the core network device(s) 106, e.g., as discussed below with reference to FIGS. 2, 3, and 4.

The core network device(s) 106 can then initiate the communication session to one of the destination(s) using the respective one of the retrieved destination number(s). For example, the core network device(s) 106 can transmit to the computing device 102 a Session Initiation Protocol (SIP) INVITE or other initiation request, depicted as incoming call 126 to the destination number 120. A call can then be established between computing devices 102 and 104. Call initiation can be performed, e.g., as defined in the Global System for Mobile (GSM) or voice-over-Long Term Evolution (VoLTE) standards, and can include the exchange of messages (not shown) between the computing devices 102 and 104 and the core network device(s) 106. Data such as audio data can be exchanged between computing devices 102 and 104 via a communications channel depicted as voice path 128.

Figure 2:
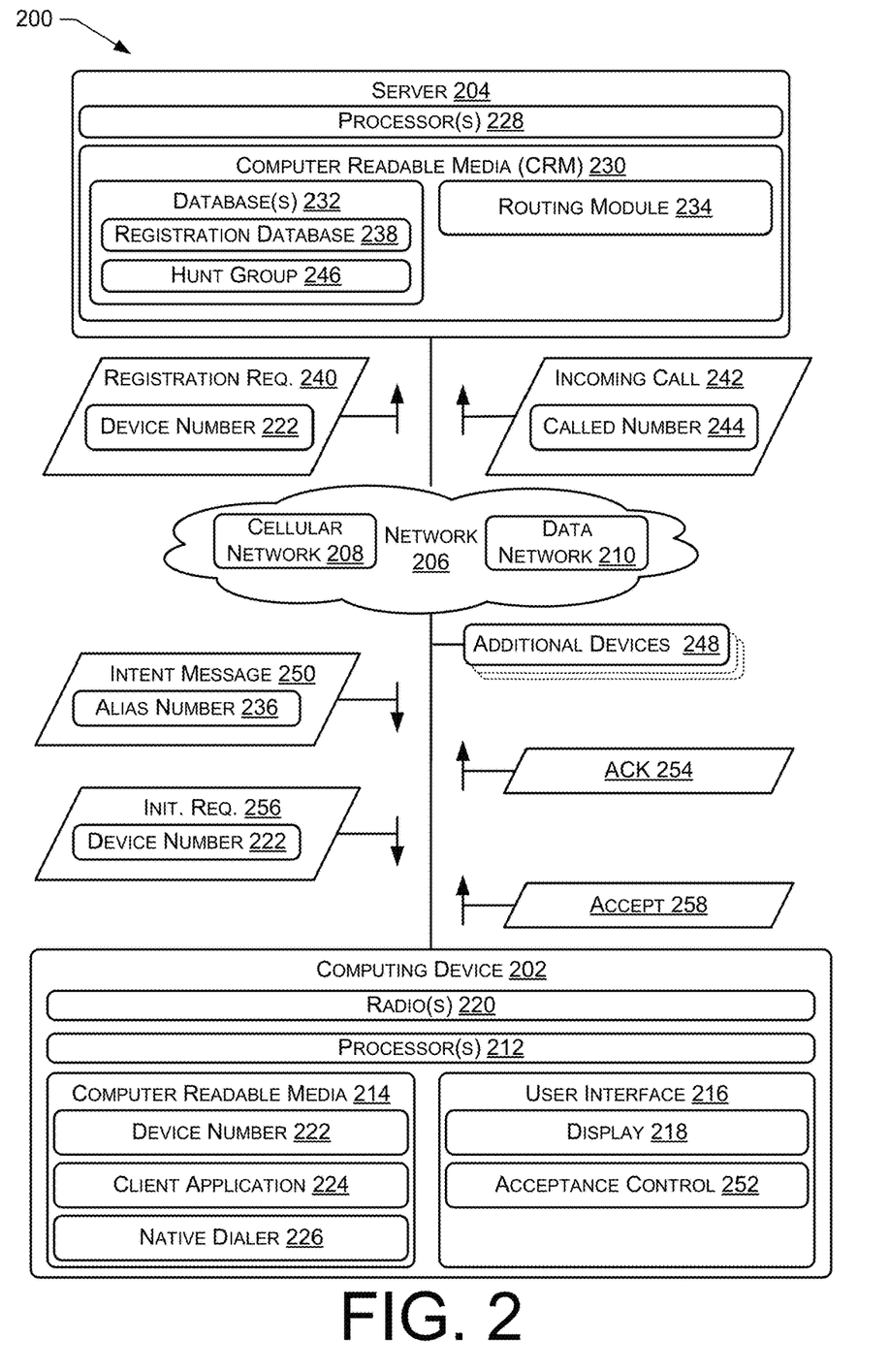
FIG. 2 is a block diagram illustrating a system that includes a client application enabling multiple line call termination according to some implementations.

FIG. 2 is a block diagram illustrating a system 200 that includes a client application enabling multiple line call termination according to some implementations. The system 200 includes a computing device 202, e.g., a wireless phone or other user equipment (UE) such as computing device 102 or 104, FIG. 1, coupled to a server 204 via a network 206. The server 204 is an example of the core network device(s) 106, FIG. 1.

The network 206 can include one or more networks, such as a cellular network 208 and a data network 210. The cellular network 208 can provide wide-area wireless coverage using a technology such as GSM, Code Division Multiple Access (CDMA), Universal Mobile Telephone Service (UMTS), Long Term Evolution (LTE), or the like. Communications between the cellular network 208 and computing devices (e.g., the computing device 202) can additionally or alternatively be performed via the cellular network 208 using other technologies, such as wired (Plain Old Telephone Service, POTS, or Public Switched Telephone Network, PSTN, lines), optical (e.g., Synchronous Optical NETwork, SONET) technologies, and the like. The data network 210 can include various types of networks for transmitting and receiving data (e.g., data packets), including networks using technologies such as Institute of Electrical and Electronics Engineers (IEEE) 802.11 ("WiFi"), IEEE 8021.15.1 ("Bluetooth"), Asynchronous Transfer Mode (ATM), wireless microwave access (WIMAX), and other network technologies, e.g., configured to transport Internet Protocol (IP) packets. In some examples, the server 204 includes or is communicatively connected with an interworking function (IWF) or other device bridging networks, e.g., LTE, third-generation cellular (3G), and POTS networks. In some examples, the server 204 can bridge Signalling System 7 (SS7) traffic from the PSTN into the network 206, e.g., permitting PSTN customers to place calls to cellular customers. As used herein, the term "call-originating device" refers to user equipment or another telecommunications or computing device communicatively connectable with the computing device 202 via one or more core network devices, e.g., server 204. Mobile phones and copper-loop landline phones can be examples of call-originating devices.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry data packets using High Speed Packet Access (HSPA), LTE, or other technologies as well as voice traffic. Some cellular networks 208 carry both data and voice in a packet-switched format. For example, many LTE networks carry voice traffic in data packets according to the voice-over-LTE (VoLTE) standard. Various examples herein provide multiple-number termination of, e.g., carrier-graded voice calls on, e.g., circuit-switched (CS) networks 206 or mixed VoLTE/3G networks 206, and on computing devices 202 including original equipment manufacturer (OEM) handsets and non-OEM handsets.

The computing device 202 can be or include a wireless phone, a wired phone, a tablet computer, a laptop computer, a wristwatch, or other type of computing device. The computing device 202 can include one or more processors 212 and one or more computer readable media 214, such as memory (e.g., random access memory (RAM), solid state drives (SSDs), or the like), disk drives (e.g., platter-based hard drives), another type of computer-readable media, or any combination thereof. The computing device 202 can further include a user interface (UI) 216, e.g., including an electronic display device 218, a speaker, a vibration unit, a touchscreen, or other devices for presenting information to a user and receiving commands from the user. The user interface 216 or components thereof, e.g., the display 218, can be separate from the computing device 202 or integrated (e.g., as illustrated in FIG. 1) with the computing device 202. The computing device 202 can further include one or more radio(s) 220 configured to selectively communicate via the network 206, e.g., via an access network 108 or 110.

The computer readable media 214 can be used to store data and to store instructions that are executable by the processors 212 to perform various functions as described herein. The computer readable media 214 can store various types of instructions and data, such as an operating system, device drivers, etc. The processor-executable instructions can be executed by the processors 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program modules, or other data.

The computer readable media 214 can store a device number 222 of the computing device 202. The device number 222 is an example of a destination number. The destination number can additionally or alternatively include a temporary routing number (TRN) or an IP Multimedia Subsystem (IMS) Routing Number (IMRN), e.g., as discussed below.

The device number 222 can be associated with the user's wireless phone. For example, when the computing device 202 is the user's wireless phone, the device number 222 can be the phone number associated with the user's wireless phone. In addition to being used as a conventional 10 digit (in the North American Numbering Plan Area, NANPA) phone number, the device number 222 can also be used in a Uniform Resource Identifier (URI), e.g., as an Internet Protocol (IP) Multimedia Public Identity (IMPU), a unique permanently allocated global identity assigned by a home network operator (e.g., the carrier).

The computer readable media 214 can include processor-executable instructions of a client application 224 or a native dialer 226. The client application 224 or the native dialer 226 can permit a user to originate and terminate calls associated with the device number 222 of the computing device 202, e.g., an MSISDN of a wireless phone. The native dialer 226 (also known as a mobile dialer) is an application that enables calls to be originated or terminated. Example networks carrying calls include second-generation (2G), 3G, or fourth-generation (4G) cellular networks, such as LTE via VoLTE using SIP signaling, and data networks, such as WIFI networks carrying VoIP calls. The client application 224 can permit a user to terminate calls for other phone numbers in addition to the device number 222.

The server 204 can include one or more processors 228 and one or more computer readable media 230. The computer readable media 230 can be used to store one or more databases 232 and processor-executable instructions of a routing module 234. The processor-executable instructions can be executed by the processors 228 to perform various functions described herein.

The databases 232 can include a database storing information, such as which alias numbers 236 are associated with a device number 222, etc. For example, the databases 232 can include a registration database 238 configured to store and provide one or more destination number(s) corresponding to particular alias numbers 236. The registration database 238 or other database 232 can be included in the server 204, as shown, or can be implementing using separate component(s), server(s), or core network device(s), e.g., a Home Location Register (HLR), Home Subscriber Server (HSS), or XML Document Management Server (XDMS). In some examples, any or each of the alias number 236, the device number 222, or any or each of the destination number(s), can be an E.164-format phone number, a national significant number, or another number that a user can dial to be connected to the corresponding device (e.g., the computing device 202).

The databases 232 can additionally or alternatively store information about the connection via network 206 to the computing device 202. For example, in a cellular mode in which the computing device 202 terminates calls using the cellular network 208, the databases 232 can store a cell global identity (CGI) of the cell site via which the computing device 202 is connected to the cellular network 208.

In some examples, the client application 224 can send a registration request 240 to register the computing device 202 with a local carrier's network. For example, the client application 224 can send the registration request 240 to the server 204 to register the computing device 202 with the local carrier associated with the network 206. The server 204 can store in the databases 232 information from the registration request 240, e.g., the International Mobile Subscriber Identity (IMSI) or device number 222 of the computing device 202. The registration request 240 can be or include a registration request for purposes of communication-session initiation, e.g., a VoLTE registration. The registration request 240 can alternatively be a separate registration, and the registration database 238 can maintain separate registrations for, e.g., call signaling (e.g., call initiation requests 256 and data transfers, such as over VoLTE) and intent signaling (e.g., intent message 250 and acknowledgement 254 transfers), discussed below.

In some examples, the registration database 238 can be updated with mapping(s) between alias number(s) and destination number(s) by configuration units or functions of the carrier operating the network 206, e.g., provisioning systems (not shown). In some examples, the registration database 238 can be updated with information on which destination number(s) are currently active, e.g., correspond to computing devices 202 that are active and communicatively connected with the network 206, using information in the registration request(s) 240. For example, the server 204 can receive at least one or at least some of the destination number(s) and the alias number, e.g., as part of a registration request 240 from the computing device 202, such as terminating user equipment. The server 204 can then store at least one of the received destination number(s) in association with the received alias number in the registration database 238. For example, the device number 222 can be included in the registration request 240 and stored in the registration database 238 as a destination number corresponding to an alias number specified by the provisioning system.

The server 204 can receive an incoming call 242 via the network 206 for routing to a particular computing device (e.g., the computing device 202). The incoming call can be placed, e.g., by user equipment (not shown) such as a computing device 104, FIG. 1. The server 204 determines a called number 244 associated with the call. The called number 244 can be the device number 222. The called number 244 can alternatively be one of the alias numbers 236, in which case the server 204 determines the device number 222 or other destination number(s) associated with the called number 244 using the routing module 234. For example, the incoming call 242 can be a business, personal, school, medical, or other call, and the user of the computing device 202 can distribute respective alias numbers 236 for each of those categories of call. This can permit the user to determine, before answering a call, in which capacity to answer.

The routing module 234 can be used to setup and route calls to the computing device 202 in which the called number 244 of the incoming call 242 is different from the device number 222, e.g., is an alias number 236. The routing module 234 can retrieve from the registration database 238 one or more destination number(s) corresponding to the alias number 236.

In some examples, the registration database 238 includes a plurality of filter criteria. The server 204, e.g., using the routing module 234, can receive from the registration database 238 at least one of the destination number(s) included in at least one of the plurality of filter criteria corresponding to the alias number. In some examples, the filter criterial include on or more initial filter criteria (iFC's).

In some examples, the server 204 determines a plurality of destination number(s) corresponding to the called number 244. For example, the called number 244 can correspond to or be part of a hunt group 246. A hunt group is a group of two or more phone numbers to which phone calls to a particular called number 244 can be distributed. In some of these examples, the server 204 can determine that the called number 244 of the incoming call 242 is in a hunt group 246. The server 204 or other components of the network 206 can substantially contemporaneously (e.g., simultaneously) route the incoming call 242 to the multiple numbers belonging to the hunt group 246, e.g., to the computing device 202 and to one or more additional devices 248. The computing device 202 and the additional devices 248 can each commence an alerting sequence, indicating (e.g., using a ring tone) that the incoming call 242 is being received, or can each display the called number 244 on their corresponding display devices 218 to enable a user of each device to determine whether or not to terminate (e.g., answer) the incoming call 242.

In some examples, the server 204 or other components of the network 206 can route the incoming call 242 to each destination number belonging to the hunt group 246 sequentially, e.g., allowing each a certain period of time to respond before moving on to the next. The period of time can be, e.g., 5 s, 10 s, a longer time, or n rings (n≥1). In some examples, the server 204 or other components of the network 206 can route the incoming call 242 to a destination number by transmitting an intent message 250 to that destination number, as discussed below with reference to FIGS. 3 and 4. In some examples, the intent message can include a SIP MESSAGE request. The intent message 250 can include the alias number 236 or other called number 244.

In some examples, in response to the intent message from the server 204, the computing device 202 can present the alias number 236 via the user interface 216. For example, the user interface 216 can display the alias number 236 on the display 218. The user interface 216 can additionally or alternatively present various information associated with terminating a call, e.g., one or more of the device number 222, the called number 244, an originating number corresponding to the caller, and a description of the alias number 236, e.g., a user-specified description such as "work" or "personal." In some examples, the processor 212 commences alerting via the user interface 216 in response to the received intent message.

Based on viewing the called number 244, the user of the computing device 202 can provide an instruction to terminate (e.g., answer) the incoming call 242. For example, the processor 212 can receive a confirmation via the user interface 216. The confirmation can include, e.g., data of an event indicating that the user has activated a call-acceptance user interface control 252, e.g., a touchscreen button, of the user interface 216 to indicate the call should be accepted.

Receiving the confirmation can include receiving from the user interface 216 an indication of actuation of the call-acceptance UI control 252.

In response to the confirmation, the processor 212 can transmit an acknowledgement 254 ("ACK") via the network 206, e.g., via the access network 108, FIG. 1. In some examples, the processor 212 discontinues alerting via the user interface 216 in response to the confirmation. In some examples, the processor 212 can invoke the native dialer 226 to process further transmissions described below.

In response to the acknowledgement 254, the server 204 can transmit, via the network 206 to the computing device 202, an initiation request 256 ("Init. Req.") of a communication session with another device, e.g., a SIP INVITE request to the device number 222. The processor 212 can, in response to the confirmation and the received initiation request 256, transmit an acceptance message 258 ("Accept") to the other device via the network 206, e.g., a SIP 2xx response code such as a 200 OK response.

In some examples, the native dialer 226 can be configured to treat the initiation request 256 as part of an existing call that began with the intent message 250 rather than as the beginning of a new call. This can permit the user to experience the intent signaling and call signaling as part of a single call rather than as two separate call events. Examples that commence alerting in response to the intent message 250 and discontinue alerting in response to the confirmation can provide the user the familiar experience of hearing a phone ring and answering the call. In these examples, the user is not required to respond to the intent message 250 and then separately respond to a subsequent initiation request 256.

The intent signaling (intent message 250, acknowledgement 254) can be conveyed by the same network(s) or protocol(s) as the call signaling (initiation request 256, acceptance message 258) or on different network(s) or protocol(s). In an example, the intent signaling can be carried via WIFI and the call signaling can be carried via GSM. In another example, the intent signaling can be carried via Hypertext Transfer Protocol (HTTP) on an LTE network and the call signaling can be carried via VoLTE. In yet another example, both the intent signaling and the call signaling can be carried via VoLTE.

In some examples, the computing device 202 communicates via a network 206 configured to convey SIP packets between the computing device 202 and the server 204. In some of these examples, the intent message 250 includes a SIP INVITE request including a header specifying the alias number. The acknowledgement 254 can include a SIP 2xx response code or other indication that the computing device 202 wishes to accept (terminate, answer) the incoming call 242. In some of these examples, a separate initiation request 256 and acceptance 258 are not used, as their functions are performed by the intent message 250 and the acknowledgement 254.

Further in response to the acknowledgement 254, the server 204 can transmit, via the network 206 to one or more of the additional devices 248 to which the incoming call 242 has been routed, cancellation messages indicating that the incoming call 242 has been, is being, or will be answered by another device. The device(s) that receive the cancellation messages can then no longer indicate that the incoming call 242 has been routed to the devices, e.g., by discontinuing an alerting sequence. For example, the user of the computing device 202 can choose to terminate the incoming call 242. The additional devices 248 can no longer indicate the presence of the incoming call 242. Thus, the computing device 202 can be used to terminate (e.g., answer) the incoming call 242 even when the called number 244 of the incoming call 242 is different from the device number 222 associated with the computing device 202.

Figure 3:
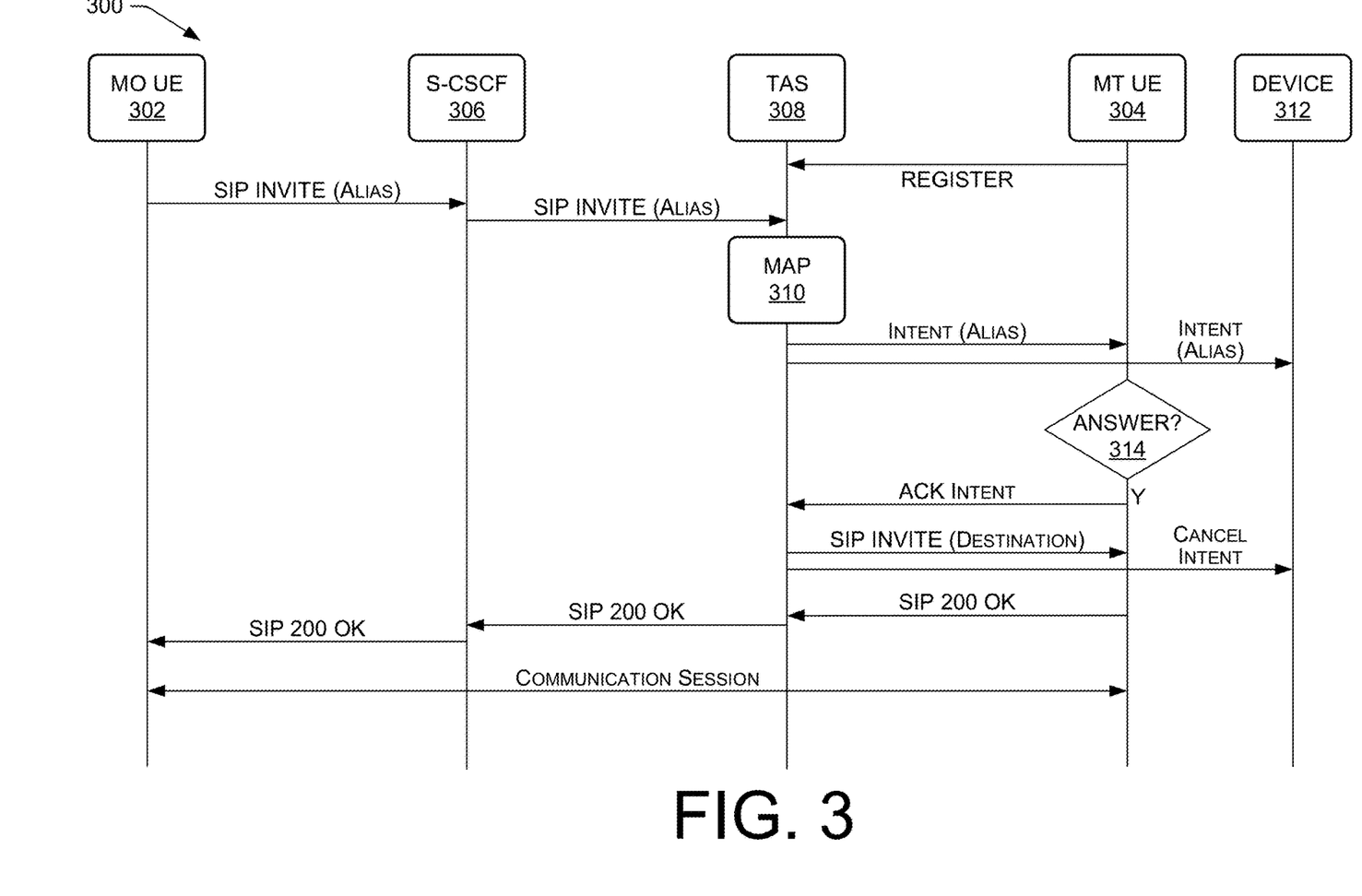
FIG. 3 shows an example call flow.

FIG. 3 shows an example call flow 300. In the illustrated example, the core network device includes a TAS and one of the destination(s) includes user equipment, as discussed below. An originating (MO) computing device, illustrated as MO UE 302, establishes a communication session with a terminating (MT) computing device, illustrated as MT UE 304. MO UE 302 can represent computing device 104. MT UE 304 can represent computing device 102 or 202. MO UE 302 sends an initiation request, e.g., a SIP INVITE, to an alias number 236, as indicated by "(Alias)" in FIG. 3. A serving call session control function (S-CSCF) 306 causes the SIP INVITE to be directed to a telephony application server (TAS) 308. The TAS 308, in mapping block 310, maps the alias number 236 to one or more destination number(s). The TAS 308 then transmits intent message(s) including an indication of the alias number 236 to one or more of the destination number(s), in this example to the MT UE 304 and one additional device 312. Two destinations are shown here but any number n≥1 of destinations can be used. In some examples herein, the TAS 308 exchanges messages with the MT UE 304 via a proxy call session control function (P-CSCF), not shown.

The MT UE 304 receives the intent message, e.g., via the access network 108, FIG. 1. The MT UE 304 then determines in decision block 314 whether to answer (terminate) the call. This can be done as discussed above with reference to FIG. 2. If so, the MT UE 304 can then transmit an acknowledgement ("ACK Intent"), e.g., via the access network 108. The TAS 308 can receive the acknowledgement from one of the destination(s), in this example the MT UE 304.

In response to the received acknowledgement, the TAS 308 can initiate the communication session to the MT UE 304. In this example the TAS 308 initiates the communication session by transmitting the SIP INVITE to the destination number of the MT UE 304, e.g., the device number 222 of the MT UE 304. In the example shown, the MT UE 304 sends a SIP 200 OK response. The TAS 308 and S-CSCF 306 pass the SIP 200 response to MO UE 302. At that point the communication session is established and MO UE 302 can exchange traffic, e.g., voice or data, with the MT UE 304.

In some examples using multiple destinations, the TAS 308, in response to receiving the acknowledgement message from the MT UE 304, can transmit cancellation messages to one or more of the destinations other than the destination that transmitted the acknowledgement message. In this example, the TAS 308 transmits the cancellation message ("Cancel Intent") to the additional device 312. In some examples, the MT UE 304 and the additional device 312 commence alerting via a user interface, e.g., by playing a ring tone, in response to receipt of the intent message. In some of these examples, the additional device 312 can discontinue alerting via the user interface in response to the cancellation message. In some examples, one or more of the additional devices such as the additional device 312 can time out, e.g., and discontinue alerting, if an initiation request is not received within a selected time period (e.g., 10 s, 15 s, or 20 s) after the transmission of the intent message.

In some examples, the intent message is or includes a SIP MESSAGE request, an HTTP request such as a GET to a Web Services or Representational State Transfer (REST) application programming interface (API) endpoint, or an ISDN User Part (ISUP) message. The core network device, e.g., the TAS 308, can be configured to transmit at least one of the indication(s) of the alias number using at least one of these types of messages. In some examples, the core network device transmits the intent message as a "push" notification, i.e., not in response to a request from the MT UE 304. In some examples, the core network device transmits the intent message as a "pull" notification, i.e., in response to a request from the MT UE 304. Such a request can be made, e.g., via an HTTP GET as noted above.

In some examples, before the communication session begins, the MT UE 304 transmits a registration message to the TAS 308 ("REGISTER"). The registration message can include, e.g., an IMSI or MSISDN of the MT UE 304. The TAS 308 or another core network device can update the registration database 238 as described above with reference to FIG. 2.

In some examples, the TAS 308 sends the intent message to the MT UE 304 via an S-CSCF (not shown) and a P-CSCF (not shown), which receives the ACK and relays it to the TAS 308. In some of these examples, the P-CSCF then transmits the invitation message (e.g., SIP INVITE) to the MT UE 304 and receives the acceptance message (e.g., SIP 200 OK).

Figure 4:
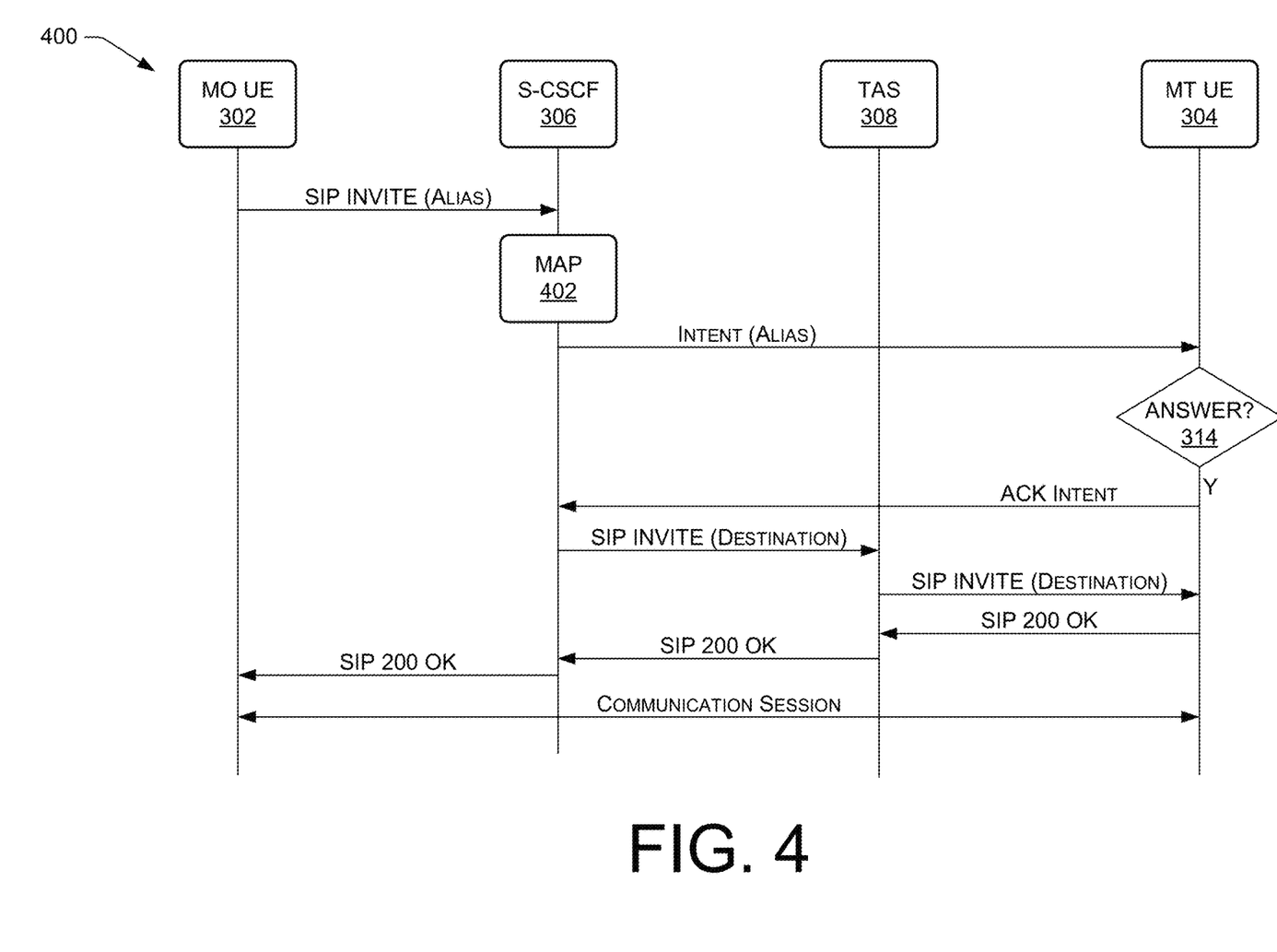
FIG. 4 shows an example call flow.

FIG. 4 shows an example call flow 400. This call flow is as shown in FIG. 3 except as noted. In this example, the S-CSCF 306 is configured to determine, at mapping block 402, the destination number(s) corresponding to the alias number 236. The S-CSCF 306 then transmits the intent message(s) to the destination(s), here the MT UE 304. In response to an acknowledgement message from the MT UE 304 ("ACK Intent"), the S-CSCF 306 causes the TAS 308 to transmit the SIP INVITE to the destination, here the MT UE 304.

In this example, the TAS 308 only processes the destination number, e.g., the device number 222 of the MT UE 304. The TAS 308 does not process the alias number 236. This can permit more efficient recordkeeping by the carrier, e.g., for billing purposes.

In some examples, a specialized application server can be used to perform the mapping (blocks 310, 402) instead of the TAS 308 or the S-CSCF 306. For example, a gateway mobile switching center (MSC, not shown) connected to the MO UE 302 can communicate with a specialized application server hosting the registration database 238. In some examples, the MSC or other core network device is configured to transmit to the registration database a Send Routing Information (SRI) request corresponding to the alias number. The registration database can provide at least one of the destination number(s) including an IMS Routing Number (IMRN) to the MSC. The MSC can then use the IMRN to locate or communicate with, e.g., another MSC (not shown) connected to the MT UE 304.

Figure 5:
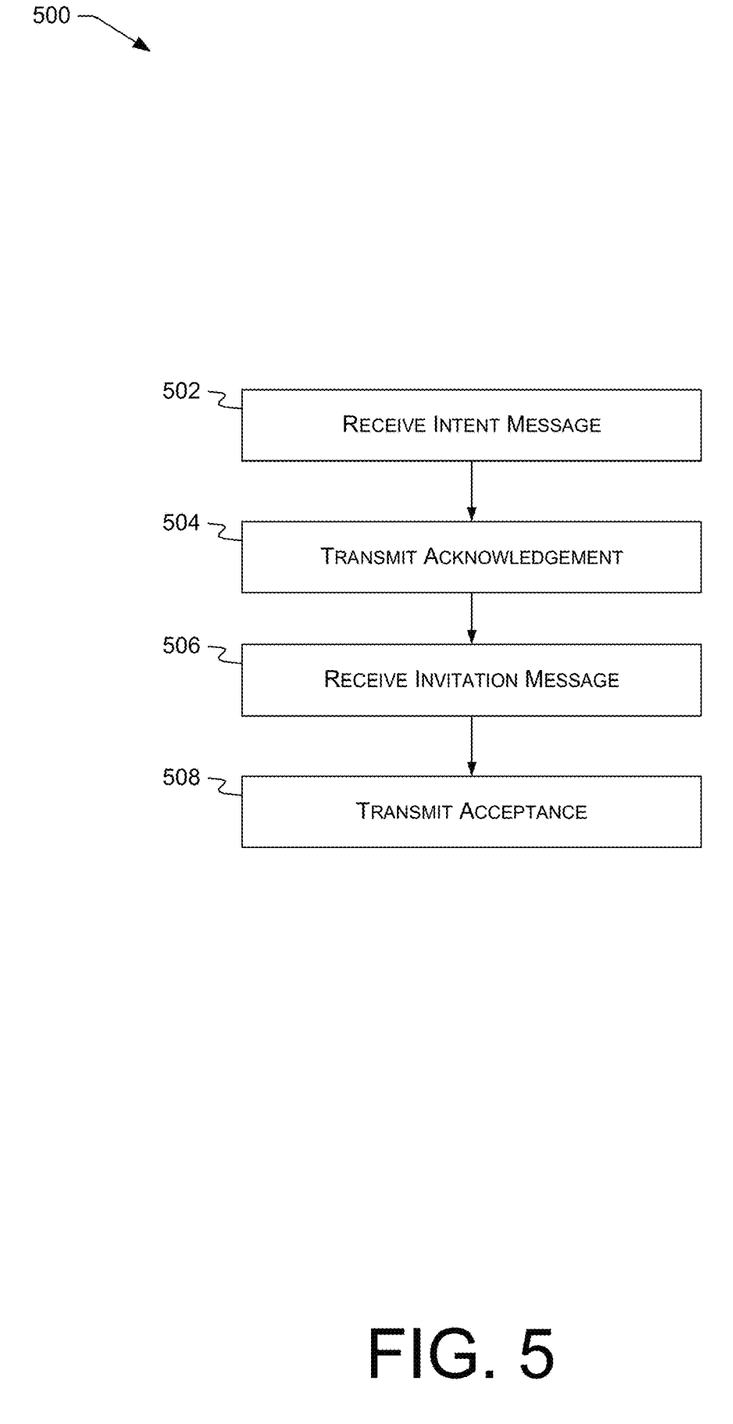
FIG. 5 illustrates an example process for establishing a communication session according to some implementations.

FIG. 5 illustrates an example process for establishing a communication session performed, e.g., by computing device 102, e.g., a UE, communicatively connectable with core network device(s) 106 of a telecommunications network 206. In some examples, the computing device 102 includes a user interface (UI) and one or more radios configured to selectively communicate via an access network and operable by one or more processors to perform operations described below.

At 502, the computing device 102 receives an intent message via the access network, the intent message indicating an alias number that is different from a device number which is associated with the user equipment.

At 504, the computing device 102 transmits an acknowledgement via the access network.

At 506, after transmitting the acknowledgement, the computing device 102 receives an invitation message for a communication session with another device via the access network, the invitation message being directed to the device number.

At 508, in response to receiving the invitation message, the computing device 102 transmits an acceptance message to the other device via the access network. In some examples, the computing device 102 can be configured to, e.g., after block 502, present the alias number via the UI, receive a confirmation via the UI, and, in response to the confirmation, transmit the acknowledgement (block 504). In some examples, the computing device 102 can be configured to transmit the acknowledgement (block 504), e.g., automatically in response to a user indication of a preferred device, or upon expiration of a timer.

Example data transmissions (parallelograms) in FIGS. 1 and 2, example data exchanges in the call flow diagrams of FIGS. 3 and 4, and example blocks in the process diagram of FIG. 5, represent one or more operations that can be implemented in hardware, software, or a combination thereof to transmit or receive described data transmissions or exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. User equipment comprising:
one or more processors; and
one or more computer readable media to store instructions that are executable by the one or more processors to perform operations comprising:
receiving an intent message via an access network, the intent message indicating an alias number that is different from a destination number which is associated with the user equipment;
transmitting an acknowledgement via the access network;
after transmitting the acknowledgement, receiving an invitation message for a communication session with another device via the access network, the invitation message being directed to the destination number; and
in response to receiving the invitation message, transmitting an acceptance message to the other device via the access network.

2. The user equipment of claim 1, wherein the operations further include:
presenting the alias number via a user interface (UI);
receiving a confirmation via the UI; and
in response to the confirmation, transmitting the acknowledgement.

3. The user equipment of claim 2, wherein the receiving the confirmation via the UI includes receiving from the UI an indication of actuation of a call-acceptance UI control and the operations further include:
in response to the received intent message, commencing alerting via the UI; and
in response to the confirmation, discontinuing alerting via the UI.

4. The user equipment of claim 2, wherein at least:
the invitation message includes a Session Initiation Protocol (SIP) INVITE request; or
the intent message includes a SIP MESSAGE request.

5. The user equipment of claim 1, wherein the operations further include:
in response to the received intent message, commencing alerting via a user interface (UI);
subsequently, determining that an initiation request has not been received within a selected time period; and
in response, discontinuing alerting via the UI.

6. The user equipment of claim 1, wherein the intent message includes a SIP INVITE request including a header specifying the alias number, and wherein the acknowledgement includes a SIP 2xx response code.

7. The user equipment of claim 1, wherein the operations further include:
in response to the received intent message, commencing alerting via the UI;
receiving a cancellation message; and
in response to the cancellation message, discontinuing alerting via the UI.

8. A method comprising:
receiving an intent message via an access network, the intent message indicating an alias number that is different from a destination number which is associated with the user equipment;
transmitting an acknowledgement via the access network;
after transmitting the acknowledgement, receiving an invitation message for a communication session with another device via the access network, the invitation message being directed to the destination number; and
in response to receiving the invitation message, transmitting an acceptance message to the other device via the access network.

9. A method of claim 8, further comprising:
presenting the alias number via a user interface (UI);
receiving a confirmation via the UI; and
in response to the confirmation, transmitting the acknowledgement.

10. The method of claim 9, wherein the receiving the confirmation via the UI includes receiving from the UI an indication of actuation of a call-acceptance UI control, and the method further comprises:
    in response to the received intent message, commencing alerting via the UI; and
    in response to the confirmation, discontinuing alerting via the UI.

11. The method of claim 10, wherein at least:
    the invitation message includes a Session Initiation Protocol (SIP) INVITE request; or
    the intent message includes a SIP MESSAGE request.

12. The method of claim 8, further comprising:
    in response to the received intent message, commencing alerting via a user interface (UI);
    subsequently, determining that an initiation request has not been received within a selected time period; and
    in response, discontinuing alerting via the UI.

13. The method of claim 8, wherein the intent message includes a SIP INVITE request including a header specifying the alias number, and wherein the acknowledgement includes a SIP 2xx response code.

14. The method of claim 8, wherein the operations further include:
    in response to the received intent message, commencing alerting via the UI;
    receiving a cancellation message; and
    in response to the cancellation message, discontinuing alerting via the UI.

15. One or more computer readable media storing instructions that are executable by one or more processors that, when executed by the one or more processors, cause the one or more processors to perform operations comprising:
    receiving an intent message via an access network, the intent message indicating an alias number that is different from a destination number which is associated with the user equipment;
    transmitting an acknowledgement via the access network;
    after transmitting the acknowledgement, receiving an invitation message for a communication session with another device via the access network, the invitation message being directed to the destination number; and
    in response to receiving the invitation message, transmitting an acceptance message to the other device via the access network.

16. The one or more computer readable media of claim 15, wherein the operations further include:
    presenting the alias number via a user interface (UI);
    receiving a confirmation via the UI; and
    in response to the confirmation, transmitting the acknowledgement.

17. The one or more computer readable media of claim 16, wherein the receiving the confirmation via the UI includes receiving from the UI an indication of actuation of a call-acceptance UI control, and
    the operations further include:
        in response to the received intent message, commencing alerting via the UI; and
        in response to the confirmation, discontinuing alerting via the UI.

18. The one or more computer readable media of claim 16, wherein at least:
    the invitation message includes a Session Initiation Protocol (SIP) INVITE request; or
    the intent message includes a SIP MESSAGE request.

19. The one or more computer readable media of claim 15, wherein the operations further include, in response to the received intent message:
    commencing alerting via a user interface (UI), and
    discontinuing alerting via the UI based on:
        subsequently determining that an initiation request has not been received within a selected time period, or
        receiving a cancellation.

20. The one or more computer readable media of claim 15, wherein the intent message includes a SIP INVITE request including a header specifying the alias number, and wherein the acknowledgement includes a SIP 2xx response code.

* * * * *